(12) United States Patent
He et al.

(10) Patent No.: US 12,487,853 B2
(45) Date of Patent: Dec. 2, 2025

(54) METHOD, APPARATUS, AND STORAGE MEDIUM FOR SCHEDULING TASKS

(71) Applicant: ALIBABA GROUP HOLDING LIMITED, Grand Cayman (KY)

(72) Inventors: Min He, Hangzhou (CN); Xiao Zheng, Hangzhou (CN); Xin Long, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 520 days.

(21) Appl. No.: 17/933,235

(22) Filed: Sep. 19, 2022

(65) Prior Publication Data
US 2023/0048833 A1 Feb. 16, 2023

Related U.S. Application Data

(63) Continuation of application No. PCT/CN2021/094117, filed on May 17, 2021.

(30) Foreign Application Priority Data

May 29, 2020 (CN) .......................... 202010475800.4

(51) Int. Cl.
*G06F 9/48* (2006.01)
*G06F 9/455* (2018.01)
*G06F 9/50* (2006.01)

(52) U.S. Cl.
CPC ............ *G06F 9/4887* (2013.01); *G06F 9/455* (2013.01); *G06F 9/45558* (2013.01); *G06F 9/48* (2013.01);
(Continued)

(58) Field of Classification Search
CPC ........ G06F 9/455; G06F 9/45558; G06F 9/48; G06F 9/4806; G06F 9/4837;
(Continued)

(56) References Cited

U.S. PATENT DOCUMENTS 7,752,622 B1 * 7/2010 Markov ................ G06F 9/4881
718/103
10,871,988 B1 * 12/2020 Gao ........................ G06F 9/505
(Continued)

FOREIGN PATENT DOCUMENTS

CN 101615135 A 12/2009
CN 106911592 A 6/2017
(Continued)

OTHER PUBLICATIONS

European Patent Office Communication issued for Application No. 21812045.9 the Supplementary European Search Report (EPC) and the European search opinion dated Jun. 30, 2023, 15 pages.
(Continued)

*Primary Examiner* — Charles M Swift
(74) *Attorney, Agent, or Firm* — Finnegan, Henderson, Farabow, Garrett & Dunner, LLP

(57) ABSTRACT

The present disclosure provides a method, an apparatus, and a non-transitory computer readable medium for scheduling tasks. The method includes acquiring task information of a current task to be executed, the task information describing the current task to be executed; determining an execution time for the current task to be executed according to the task information; and comparing the execution time with a preset scheduling time corresponding to the current task to be executed, and adjusting an actual scheduling time corresponding to a next task to be executed according to the comparison result so as to determine whether to schedule the next task to be executed

20 Claims, 7 Drawing Sheets

(52) U.S. Cl.
CPC .......... *G06F 9/4806* (2013.01); *G06F 9/4837* (2013.01); *G06F 9/4843* (2013.01); *G06F 9/485* (2013.01); *G06F 9/4881* (2013.01); *G06F 9/50* (2013.01)

(58) Field of Classification Search
CPC ...... G06F 9/4843; G06F 9/485; G06F 9/4881; G06F 9/4887; G06F 9/50
See application file for complete search history.

(56) References Cited

U.S. PATENT DOCUMENTS

| | | | | |
|---|---|---|---|---|
| 11,726,817 | B2 * | 8/2023 | Floyd | G06F 9/505 718/102 |
| 2003/0154234 | A1 | 8/2003 | Larson | |
| 2008/0086734 | A1 * | 4/2008 | Jensen | G06F 9/4881 718/104 |
| 2008/0155550 | A1 * | 6/2008 | Tsafrir | G06F 9/5066 718/103 |
| 2011/0154318 | A1 * | 6/2011 | Oshins | G06F 9/45537 718/1 |
| 2011/0154353 | A1 | 6/2011 | Theroux et al. | |
| 2015/0178126 | A1 * | 6/2015 | Modani | G06F 9/4881 718/102 |
| 2016/0085587 | A1 * | 3/2016 | Dube | G06F 9/4881 718/104 |
| 2016/0098292 | A1 * | 4/2016 | Boutin | G06F 9/4881 718/104 |
| 2020/0167191 | A1 | 5/2020 | Yeh et al. | |

FOREIGN PATENT DOCUMENTS

| | | |
|---|---|---|
| CN | 107589993 A | 1/2018 |
| CN | 108268312 A | 7/2018 |
| CN | 108319499 A | 7/2018 |
| CN | 108701285 A | 10/2018 |
| CN | 108845868 A | 11/2018 |
| CN | 109144680 A | 1/2019 |
| CN | 109491773 A | 3/2019 |
| CN | 109558227 A | 4/2019 |
| CN | 109885389 A | 6/2019 |
| CN | 110119306 A | 8/2019 |
| CN | 111190714 A | 5/2020 |
| JP | 2003509766 A | 3/2003 |
| JP | 2007510229 A | 4/2007 |
| JP | 2017526999 A | 9/2017 |
| JP | 2017538204 A | 12/2017 |
| WO | 2017072933 A1 | 5/2017 |

OTHER PUBLICATIONS

First Search Report issued in corresponding Chinese Application No. 202010475800.4 on Nov. 16, 2021 (2 pages).
Supplemental Search Report issued in corresponding Chinese Application No. 202010475800.4 on Mar. 14, 2022 (1 page).
PCT International Search Report and Written Opinion mailed Aug. 17, 2021, issued in corresponding International Application No. PCT/CN2021/094117 (12 pgs.).
Japanese Office Action issued in corresponding Japanese Application No. 2022-558396 on Apr. 16, 2025 (8 pages).

* cited by examiner

METHOD, APPARATUS, AND STORAGE MEDIUM FOR SCHEDULING TASKS

CROSS-REFERENCE TO RELATED APPLICATIONS

The disclosure claims the benefits of priority to PCT Application No. PCT/CN2021/094117, filed on May 17, 2021, which claims the benefits of priority to Chinese Patent Application No. 202010475800.4, filed on May 29, 2020, both of which are incorporated herein by reference in their entireties.

TECHNICAL FIELD

The present disclosure relates to the technical field of computer technologies and more particular, to a method, an apparatus, and non-transitory computer readable medium for scheduling tasks.

BACKGROUND

With the rapid development of the Internet, cloud services have a number of advantages over conventional computing services, such as lower price, ease of extensibility, scalability, ease of management, and high availability, and thus occupy an increasingly critical position in the information Internet era. In addition, container technology is widely used in the field of cloud services because of its characteristics.

However, due to the rapid development of artificial intelligence, heterogeneous computing has become an emerging hotspot for cloud services. As a result, cloud servers can include multiple kinds of hardware resources, such as multiple kinds of physical processing devices. How to schedule these hardware resources in an efficient and convenient way can be the key to scheduling resources.

SUMMARY OF THE DISCLOSURE

Embodiments of the present disclosure provide methods, computing devices, and storage medium for scheduling tasks, which achieve efficient and convenient scheduling of hardware resources.

The embodiments of the present disclosure provide a method for scheduling tasks. The method includes: acquiring task information of a current task to be executed, the task information describing the current task to be executed; determining an execution time for the current task to be executed according to the task information; and comparing the execution time with a preset scheduling time corresponding to the current task to be executed, and adjusting an actual scheduling time corresponding to a next task to be executed according to the comparison result so as to determine whether to schedule the next task to be executed.

The embodiments of the present disclosure provide an apparatus for scheduling tasks, the apparatus includes a memory configured to store instructions; and one or more processors configured to execute the instructions to cause the apparatus to perform acquiring task information of a current task to be executed, the task information describing the current task to be executed; determining an execution time for the current task to be executed according to the task information; and comparing the execution time with a preset scheduling time corresponding to the current task to be executed, and adjusting an actual scheduling time corresponding to a next task to be executed according to the comparison result so as to determine whether to schedule the next task to be executed.

The embodiments of the present disclosure provide a non-transitory computer readable medium that stores a set of instructions that is executable by one or more processors of an apparatus to cause the apparatus to initiate a method for scheduling tasks. The method includes acquiring task information of a current task to be executed, the task information describing the current task to be executed; determining an execution time for the current task to be executed according to the task information; and comparing the execution time with a preset scheduling time corresponding to the current task to be executed, and adjusting an actual scheduling time corresponding to a next task to be executed according to the comparison result so as to determine whether to schedule the next task to be executed.

BRIEF DESCRIPTION OF THE DRAWINGS

To describe the embodiments of the present disclosure more clearly, the following briefly describes the accompanying drawings required for the embodiments. The accompanying drawings in the following description show merely some embodiments recorded in this disclosure, and a person of ordinary skill in the art may still derive other drawings from these accompanying drawings without creative efforts.

DETAILED DESCRIPTION

Figure 1:
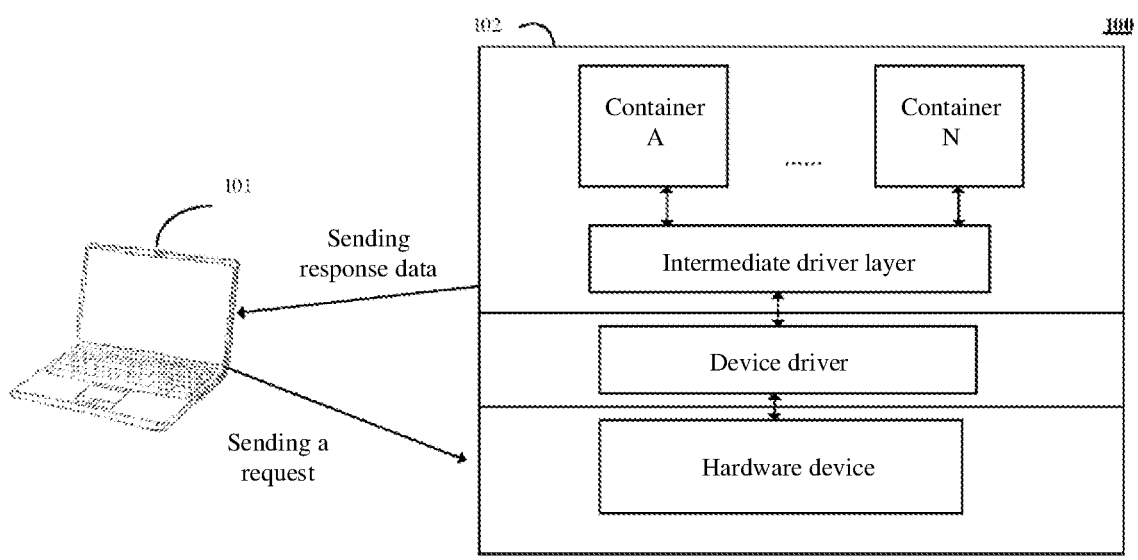
FIG. 1 is a schematic structural diagram of an example system for scheduling tasks, according to some embodiments of the present disclosure.

In order to make the objectives, technical solutions and advantages of the present disclosure clearer, the technical solutions of the present disclosure will be clearly and completely described below in conjunction with the specific embodiments of the present disclosure and the corresponding accompanying drawings. Obviously, the described embodiments are only part of the embodiments of the present disclosure, but not all of them. Based on the embodiments in the present disclosure, all the other embodiments obtained by those of ordinary skill in the art without making any inventive labor fall within the scope of protection of the present disclosure.

Container technology is a technology for packaging software into standardized units for use in development, delivery, and deployment. It ensures the consistency of the application operating environment, achieves faster startup, and has properties such as isolation, extensibility, ease of migration, and sustainable delivery and deployment. Based on the above properties, container technology is widely applied in the field of cloud services. Due to the rapid development of artificial intelligence, heterogeneous computing has become an emerging hotspot for cloud services.

In a cloud server including multiple processing devices, such as GPUs (Graphics Processing Units), NPUs (neural-network processing units), as well as containers, the critical core is how to efficiently and easily schedule GPU hardware resources so that they can be shared seamlessly across multiple containers, while keeping the overhead of the scheduling algorithm to be small enough.

The embodiments of the present disclosure propose a method that can meet the above requirements and can also work well for scheduling black-box GPU device drivers that are not open source.

In the embodiments of the present disclosure, task information of a current task to be executed is acquired, the task information describing the current task to be executed. An actual execution time for the current task to be executed is determined according to the task information. The actual execution time is compared with a preset scheduling time corresponding to the current task to be executed, and an actual scheduling time corresponding to a next task to be executed is adjusted according to the comparison result so as to determine whether to schedule the next task to be executed. By comparing the actual execution time with the preset scheduling time after determining the actual execution time, the actual scheduling time corresponding to the next task to be executed can be adjusted so as to decide whether to perform task scheduling, thus achieving quick and easy task scheduling and full utilization of hardware resources. Moreover, since the actual scheduling time is adjusted, the actual scheduling time for each task can be accurately and efficiently allocated, and the scheduling time can be balanced among the tasks, thus reducing the situation where the current task to be executed excessively occupies the scheduling time for other tasks.

In addition, as a device driver is not used to acquire the drive method to perform task scheduling, this is very friendly for the non-open source device drivers because there is no need to care about whether the device driver is open source or not (i.e., the device driver can be open source or non-open source), and the development of device drivers can be reduced.

The technical solutions provided by the embodiments of the present disclosure are described in detail below in conjunction with the accompanying drawings.

FIG. 1 is a schematic structural diagram of an example system for scheduling tasks, according to some embodiments of the present disclosure. As shown in FIG. 1, this system 100 may include a first device 101 and a second device 102.

First device 101 may be a device with certain computing power, which can implement the functions of sending data to second device 102 and acquiring response data from second device 102. A basic structure of first device 101 may include at least one processor. The number of processors may depend on the configuration and type of the apparatus with certain computing power. The apparatus with certain computing power may also include a memory, which may be volatile, such as Random Access Memory (RAM), or may be non-volatile, such as read-only memory (ROM), flash memory, etc., or may include both types at the same time. The memory usually stores an operating system (OS), one or more applications, and may also store program data, and the like. In addition to the processing unit and memory, the apparatus with certain computing power further includes some basic configurations, such as a network card chip, an input/output (IO) bus, display components, and some peripheral devices. Alternatively, these some peripheral devices may include, for example, a keyboard, an input pen, and the like. Other peripheral devices are well known in the field and will not be elaborated herein. Alternatively, first device 101 may be a smart terminal, e.g., a cell phone, a desktop computer, a laptop, a tablet computer, etc.

Second device 102 is a device that can provide computing and processing services in a network virtual environment, and may be a device that performs data processing and performs task scheduling using the network. In terms of physical implementation, second device 102 may be any device capable of providing computing services, responding to service requests, and returning data processing results. For example, it may be a cloud server, a cloud host, a virtual center, a conventional server, etc. The composition of second device 102 mainly includes a processor, a hard disk, a memory, a system bus, etc., which is similar to that of a common computer architecture.

In the embodiments of the present disclosure, first device 101 sends data to second device 102. Second device 102 receives the data and sends the data to a corresponding virtual device, such as a container. In second device 102, at least one virtual device, such as a container, is included. Meanwhile, second device 102 may further include a device driver (which may also be referred to as a device driver layer or a device driver program) as well as an intermediate driver layer. A task scheduler may be provided in the intermediate driver layer for use in task scheduling. The intermediate driver layer communicates with the device driver via a communication interface. When the virtual device in second device 102 receives the data, it needs to process the data, that is, process the data to generate a task (i.e., a task to be executed) and send it to the task scheduler in the intermediate driver layer. After receiving the task to be executed, the task scheduler acquires task information of the current task to be executed, the task information describing the current task to be executed; determines an actual execution time for the task to be executed according to the task information; and compares the actual execution time with a preset scheduling time corresponding to the current task to be executed, and adjusts an actual scheduling time corresponding to a next task to be executed according to the comparison result so as to determine whether to schedule the next task to be executed (which may be from the same source or from a different source). Moreover, the task scheduler sends the task to be executed through the device driver to a corresponding processing device, such as a GPU, to enable the corresponding processing device to process the task, and after processing the task, the corresponding processing device returns the result of the task to the corresponding virtual device. The virtual device then returns the result of the task to first device 101.

It should be noted that the process of returning the result of the task to first device 101 by the virtual device may be a process of execution by the device driver in second device 102, and the specific execution process is similar to that described above, which will not be described here.

In addition, the task scheduler may also be provided in the driver device, provided that the driver device is open source. There is no need to deploy an additional intermediate driver layer.

In the application scenario of the embodiments of the present disclosure, a user sends data, for example, a request for account login which may carry an account number and a password, to second device 102 (e.g., a cloud server) via first device 101 (e.g., a computer). The user may send the data via a browser installed on first device 101. A virtual device in second device 102, for example, container A, receives the data and acquires the account number and the password. Container A sends a task to the task scheduler in the intermediate driver layer of second device 102. The task may be an execution instruction for verifying whether the account number and the password are correct. After receiving the task, the task scheduler acquires the above execution instruction based on a storage address carried by the task, and may input the execution instruction into a preset model to perform prediction of the actual execution time. At the same time, the task scheduler may send the task via the device driver to a corresponding processing device, such as a GPU. After receiving the task, the GPU processes the task. When the account number and password of the result of processing are correct, it can be determined that the result is correct and login can be performed. Container A acquires the result of processing and returns the result of processing to the computer of the user via second device 102, indicating that the login is successful.

In addition, the task scheduler, after predicting the actual execution time, compares the actual execution time with the corresponding preset scheduling time. If the predicted actual execution time is greater than the preset scheduling time, an excess time is determined, and the actual scheduling time for the next task to be executed of container A is reduced with a magnitude of the reduced time being the magnitude of the excess time. Then, the updated actual scheduling time is used as the actual scheduling time for the subsequent task to be executed, until the actual scheduling time for the subsequent task to be executed of container A is updated to be reduced to 0. Then, the scheduling is not performed for the subsequent task to be executed when the subsequent task to be executed can be scheduled, but waiting for the next time when task scheduling can be performed, for example, the task to be executed is performed when the next preset scheduling time arrives.

If the predicted actual execution time is less than the preset scheduling time, an idle time is determined. In this case, the task scheduler may either not perform any processing or, alternatively, compensate the idle time to the actual scheduling time for the next task to be executed (which may be a task from the same container or a task from a different container). After the task scheduler executes the adjustment of the actual scheduling time for the current task and performs the task scheduling, the task scheduler performs a scheduling of the next task, i.e., repeating the foregoing contents.

In this example, network connection is implemented between first device 101 and second device 102, where the network connection may be a wireless connection. If there is a communication connection between first device 101 and second device 102, the network standard of the mobile network may be any one of 2G (GSM), 2.5G (GPRS), 3G (WCDMA, TD-SCDMA, CDMA2000, UTMS), 4G (LTE), 4G+ (LTE+), WiMax, 5G, etc.

The scheduling process for tasks will be described in detail below in conjunction with method embodiments.

Figure 2:
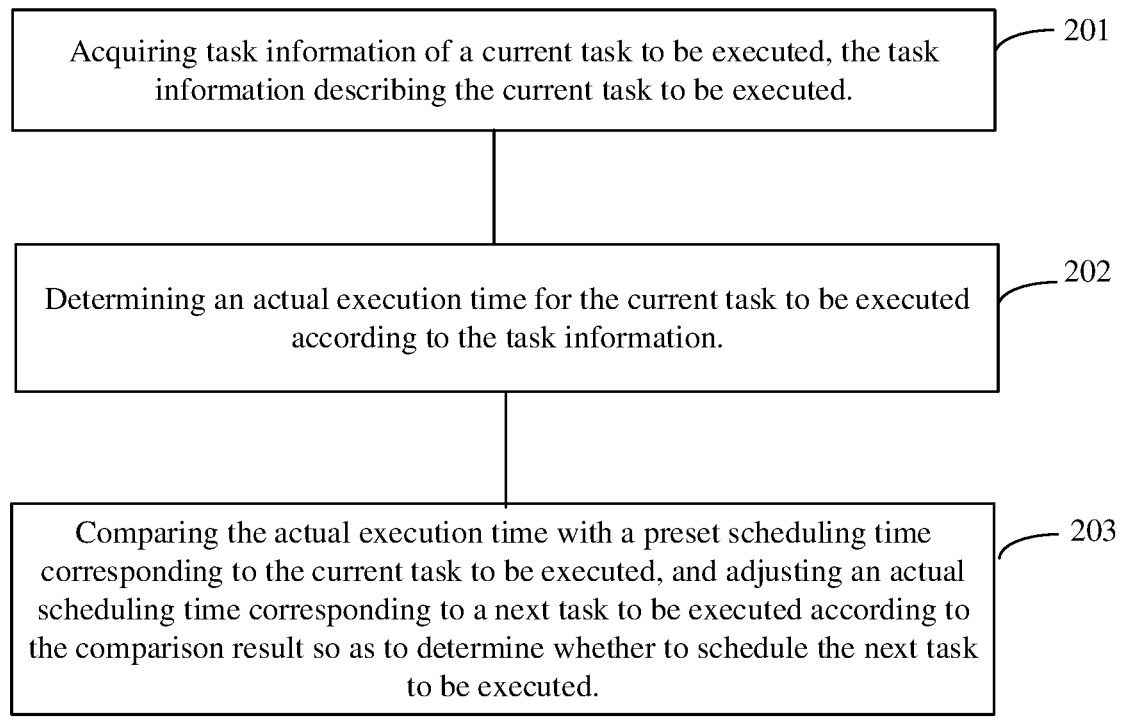
FIG. 2 is a flow chart of an example method for scheduling tasks, according to some embodiments of the present disclosure.

FIG. 2 is a flow chart of an example method for scheduling tasks, according to some embodiments of the present disclosure. The method 200 provided by the embodiments of the present disclosure is performed by a computing device, for example, a cloud server, and more specifically, a task scheduler in the cloud server. Method 200 includes the following steps.

At 201, task information of a current task to be executed is acquired, the task information describing the current task to be executed.

At 202, an actual execution time for the current task to be executed is determined according to the task information.

At 203, the actual execution time is compared with a preset scheduling time corresponding to the current task to be executed, and an actual scheduling time is adjusted corresponding to a next task to be executed according to the comparison result so as to determine whether to schedule the next task to be executed.

It should be noted that according to the foregoing contents, it can be known that the task scheduler may either be provided in a device driver in the cloud server or in an intermediate driver layer which may be deployed over the device driver, that is, the intermediate driver layer is communicatively connected to the device driver. In the case where the task scheduler is deployed in the intermediate driver layer, it is not necessary to be concerned about whether the device driver is open source or whether the device driver belongs to a third party.

Details of the above steps are provided below.

At 201, task information of a current task to be executed is acquired, the task information describing the current task to be executed.

The task to be executed is a task to be processed by a hardware resource (which may also be referred to as a hardware device) in a physical device, for example, a task to be processed by a GPU in the cloud server. The task may be a task instructing at least one processing device to verify whether a password and a user name are correct. The current task to be executed is a task that the task scheduler is preparing to schedule at the moment.

The hardware resources may also include, for example, a CPU, an NPU, a memory, a disk, a network, etc. In addition to the processing device, other hardware devices may assist the processing device to perform task processing, etc., so that the utilization of other hardware devices can also be balanced.

The manner for acquiring the current task to be executed may include: receiving, via a communication interface, the current task to be executed sent by a virtual device, each virtual device corresponding to an independent communication interface. That is, each virtual device has a one-to-one correspondence with a communication interface. In addition, each of the virtual devices and communication interfaces has its own identifier, such as ID. Therefore, based on the correspondence, after receiving the current task to be executed, the task scheduler in the cloud server may learn about the virtual device to which the current task to be executed belongs based on the identifier of the communication interface used to transmit the current task to be executed.

The communication interface may achieve communication by creating node files.

The virtual device is a standalone device, such as a container, a sandbox, etc., that runs directly based on the operating system of a physical device. The physical device may refer to a physical host, such as a cloud server host. It should be understood that for a virtual machine which is not running directly based on the operating system of the physical device, but indirectly based on that operating system, although the virtual machine has its own virtual operating system and also virtual hardware resources (e.g., a virtual CPU), etc., these are not really hardware resources of the physical device, but a virtualization of the hardware resources.

In addition, virtual devices capable of implementing the embodiments of the present disclosure are within the scope of protection of the embodiments of the present disclosure, and are not limited to containers.

It should also be noted that the virtual device is already created on the physical device. Or, in other words, the physical device may create the virtual device as needed. As the creation process is known by the person skilled in the art, it will not be elaborated here. It should be understood that embodiments of the present disclosure are based on the situation where the physical device has already created multiple virtual devices, or at least one virtual device. The virtual device may create a user mode in the physical device. The user mode is a privilege level in the operating system (e.g., Linux operating system), and in the user mode, programs therein are not allowed to perform operations that require a privileged mode in the processor (e.g., CPU, GPU, etc.) in order to avoid crashes of the operating system.

Specifically, acquiring task information of a current task to be executed includes: acquiring the task information according to a storage address carried by the current task to be executed.

The task information describes the current task to be executed, for example, an execution instruction for the current task to be executed.

The storage address is an address for storing the task information, such as a buffer address of a buffer or a cache address of a cache.

It should be noted that in addition to carrying the storage address, the task to be executed may also has other information, such as information indicating which processing device is to perform task processing (carrying the identifier of the processing device), and the like.

Figure 3:
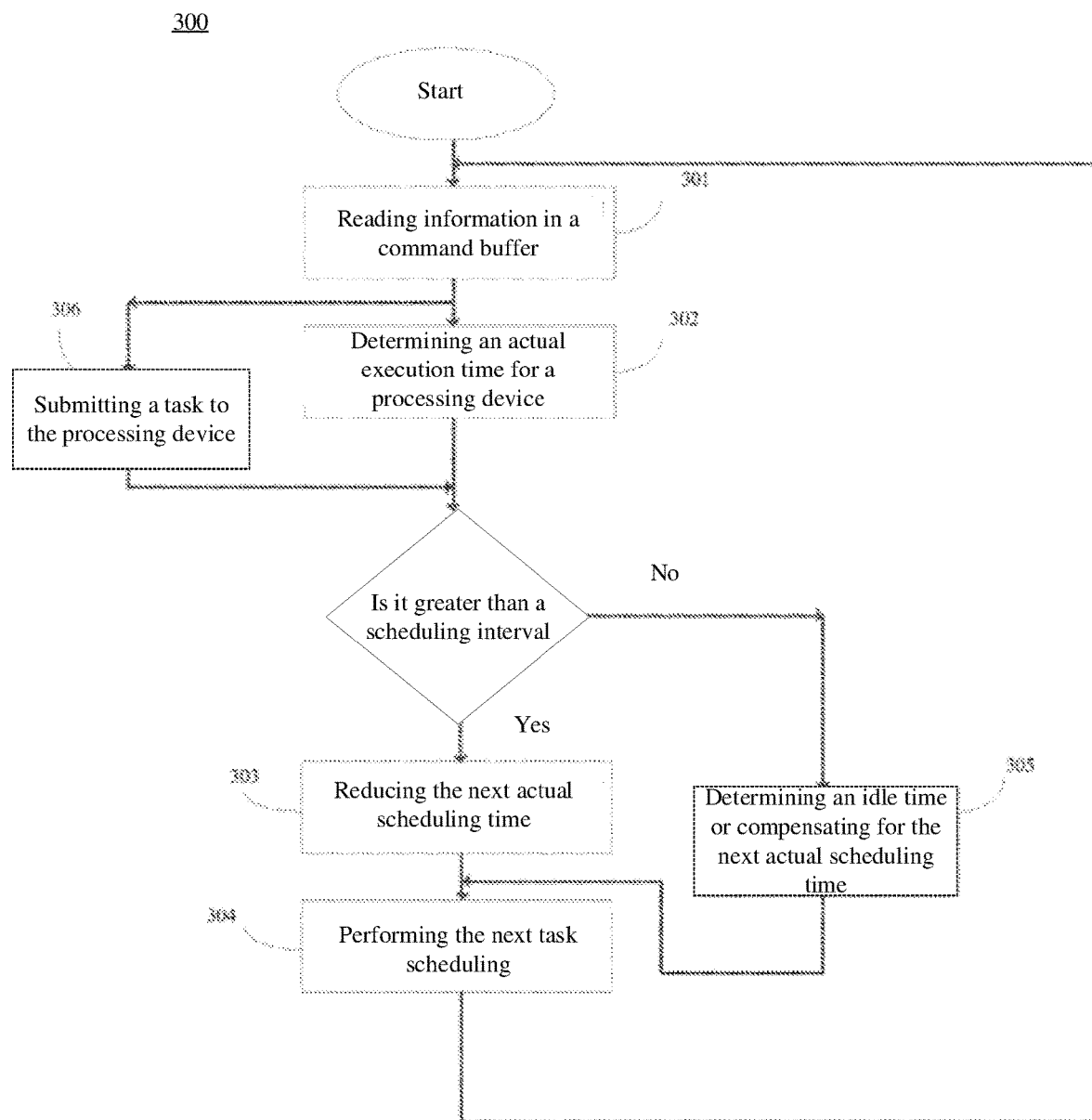
FIG. 3 is a flow chart of an example method for scheduling tasks, according to some embodiments of the present disclosure.

For example, the task scheduler in the cloud server receives the current task to be executed A (hereafter also referred to as task A), reads the current task to be executed A, and acquires a buffer address of a command buffer that the task A carries from the task A. The task scheduler reads the buffer address and reads the corresponding execution instruction. That is, as shown in FIG. 3, step 301 is executed: reading information in the command buffer.

It should be noted that the buffer address may be the start address of the corresponding buffer and the length of the buffer, which enable the task scheduler to read the execution instruction from the corresponding buffer location in the corresponding buffer. The buffer address may also be the front and rear pointers of the buffer, which enable the task scheduler to read the execution instruction from the corresponding buffer location in the corresponding buffer. If there are multiple buffers, the buffer address may also carry information, for example, the identifier of the buffer, which enable the task scheduler to find the corresponding buffer.

At 202, an actual execution time for the current task to be executed is determined according to the task information.

The actual execution time is the execution time for executing the task to be executed and, in particular, the actual execution time for executing the task to be executed by the processing device.

Determining an actual execution time for the current task to be executed according to the task information includes: determining an actual execution time for executing the task information as the actual execution time for the current task to be executed. That is, the actual execution time obtained by executing the task information is used as the actual execution time for executing the task to be executed.

The actual execution time may be determined in a manner as follows.

1) Determining an actual execution time for executing the task information includes: inputting the task information into a preset model, and determining an output of the preset model as the actual execution time.

The preset model is a model for predicting the actual execution time for the task information. The model may be a neural network model, and may be generated through training. Before the training, the corresponding training data, such as multiple pieces of task information (e.g., multiple execution instructions) and the actual execution time for the corresponding processing device, may be acquired. During the training process, the preset model is generated by analyzing the task information to acquire task information features of the task information and performing training according to the corresponding actual execution time.

It should be noted that since processing devices may be of different types, such as CPUs, GPUs, and NPUs, a plurality of corresponding preset models may be generated according to the different types of processing devices for performing prediction of the actual execution time for each of the processing devices, respectively.

Once the model is generated, the prediction can be performed. The task scheduler in the cloud server may input the task information into a corresponding preset model. For example, if the execution instruction is for a GPU processing device, the execution instruction is input into a preset model corresponding to the GPU to obtain an output of the preset model as the actual execution time for the GPU to execute the execution instruction. That is, as shown in FIG. 3, step 302 is implemented: determining the actual execution time for the processing device.

2) Determining an actual execution time for the current task to be executed according to the task information includes: matching the task information with multiple pieces of preset task information, and selecting a preset execution time corresponding to the matched preset task information, according to the matching result, as the actual execution time.

In addition, the cloud server may also acquire multiple execution instructions as well as actual execution times corresponding to different processing devices, and store such information to a local preset storage region, or a database server. After the task scheduler in the cloud server acquires the task information (e.g., an execution instruction), the acquired execution instruction is compared or matched with the stored multiple execution instructions, and an execution instruction from the multiple execution instructions is determined, wherein the determined execution instruction has a similarity within a certain threshold of the acquired execution instruction or is the same as the acquired execution instruction. The cloud server acquires the corresponding actual execution time according to the determined execution instruction.

It should be understood that the actual execution time may be different for different processing devices, so an execution instruction may store multiple actual execution times. Different processing devices correspond to different actual execution times, and a corresponding actual execution time is determined for the task scheduler based on the processing device required for the task information.

At 203, the actual execution time with a preset scheduling time corresponding to the current task to be executed is compared, and an actual scheduling time corresponding to a next task to be executed is adjusted according to the comparison result so as to determine whether to schedule the next task to be executed.

The preset scheduling time, which may also be referred to as a preset time slice, is a time used to occupy hardware resources, which is usually a period of time, such as 10 ms (milliseconds). Illustration will be provided below using an example of a processor. For example, for CPUs, multiple time slices may be divided for each CPU and assigned to different containers, so that the CPU can process the to-be-processed tasks from the containers according to the time slices, thus enabling the CPU to process multiple tasks over a period of time. In addition, for a multi-core CPU, multiple time slices may be divided for each core and assigned to different containers, so that the CPU core can process the to-be-processed tasks from the containers according to the time slices, thus enabling the CPU to process multiple tasks over a period of time. The situation is similar for GPUs and NPUs, which will not be elaborated here. This may also be used as a basis for dividing other hardware resources. Therefore, the cloud server may divide time slices for different virtual devices, such as containers. The preset time slices for the same container are the same, i.e., the preset scheduling times are the same. Then, the preset time slices for different tasks to be executed from the same container are also the same. The time slices may be different or the same for different containers. The preset scheduling time may be pre-divided by the task scheduler.

Corresponding to the preset scheduling time, there is also an actual scheduling time. Given the preset scheduling time, for a processing device, the actual scheduling time refers to an amount of time that the processing device can actually have to allow the processing device to perform task processing on the tasks to be executed.

Although a corresponding preset scheduling time is set for each container, the execution time for the task to be executed in a hardware resource (e.g., a processing device) may exceed the preset scheduling time, resulting in occupation of the preset scheduling time for a task to be executed that is later submitted. For example, for a processing device GPU1, the task scheduler may first schedule task A from container A to GPU1 for task processing. However, since GPU1 takes too much time to process the task A, which exceeds the preset scheduling time, the processing time for a subsequent task is compressed. For example, a task waiting for GPU1 to process after task A at this moment is task B from container B. Since the scheduling time for task B is occupied, the task B cannot fully utilize its own preset scheduling time, which in turn affects the quality of service (QoS) of container B.

Therefore, an actual scheduling time is set to quantify the time amount for which each task in each container can actually occupy the processing device, i.e., how much time is actually available for each task.

For example, as described above, the task scheduler in the cloud server, after receiving task A sent by container A, determines that task A is targeted to GPU1 and also determines the actual execution time of the processing of task A through the GPU1. The task scheduler compares the actual execution time of 15 ms with the preset scheduling time of 10 ms corresponding to container A and finds that the actual execution time is greater than the preset scheduling time, then the task scheduler reduces the actual scheduling time for the next task to be executed from container A. That is, as shown in FIG. 3, step 303 is executed: reducing the next actual scheduling time. In this way, the scheduling time for the next task to be executed from container A is used to compensate for the scheduling time for a task to be processed from other containers.

In addition, the task scheduler compares the actual execution time of 7 ms with the preset scheduling time of 10 ms corresponding to container A and finds that the actual execution time is less than the preset scheduling time, then in this case, the corresponding processing device may be idled, or the actual scheduling time for the next task to be executed from container A can be compensated. As shown in FIG. 3, step 305 is executed: determining an idle time or compensating for the next actual scheduling time.

It should be noted that if the task scheduler finds that the actual execution time is equal to the preset scheduling time corresponding to container A, the task scheduler can either not perform adjustment, or maintain the current scheduling time that has been reduced (i.e., the actual scheduling time).

In addition, for the current task to be executed, if it is during the container initialization phase, that is, the current task to be executed sent by the container is the first task to be executed from the container, the actual scheduling time is the preset scheduling time and may be further used as the actual scheduling time for the second task to be executed from the container for subsequent updates. At this point, before performing step 302, the task scheduler may perform step 306: submitting the task to the processing device for task processing by the processing device. After receiving task A from container A, the task scheduler acquires the execution instruction and then directly submits task A to the corresponding GPU for task processing. However, if the container has been running for a period of time, the task scheduler, after receiving task A, may first detect whether the actual scheduling time for container A to which the current task A belongs is 0. If the actual scheduling time is 0, no processing will be performed and step 306 is not executed. Step 306 and the step of adjusting the actual scheduling time will not be performed until the next preset scheduling time arrives.

For the current task to be executed, after completing the adjustment of the actual scheduling time corresponding to the next task to be executed from the same source (e.g., same container), the task scheduler may continue to schedule the next task to be executed and adjust the actual scheduling time. That is, step 304 is executed: performing the next task scheduling.

The specific implementation of step 203 is as follows.

Adjusting an actual scheduling time corresponding to a next task to be executed according to the comparison result includes: determining an excess time when the comparison result is that the actual execution time is greater than the preset scheduling time; and adjusting the actual scheduling time corresponding to the next task to be executed from the same source according to the excess time to obtain an updated actual scheduling time, and continuing to use the updated actual scheduling time as an actual scheduling time for a subsequent task to be executed from the same source until a subsequent updated actual scheduling time is reduced to 0. When the current task to be executed is an initial task to be executed from the same source, an actual scheduling time corresponding to the current task to be executed is the same as the actual scheduling time corresponding to the next task to be executed from the same source, which is the preset scheduling time.

For example, as described above, the task scheduler receives task A (i.e., the current task to be executed) sent from container A and acquires execution instruction of the task A. The corresponding actual execution time is determined as 15 ms, and the corresponding actual execution time is compared with the preset scheduling time of 10 ms for container A to determine that the excess time is 5 ms. Then, the next time the task scheduler receives a task sent by container A, such as task B, the actual scheduling time of task B is 10−5=5 ms, i.e., changing from the original 10 ms (in this case, the preset scheduling time may be considered as the actual scheduling time in the case where there is no excess time, for example, if task A is the first task from container A, or if none of the previous tasks from container A has excess time or idle time, then the actual scheduling time for task A can be the preset scheduling time and used as the actual scheduling time for task B) to 5 ms. Then, the actual scheduling time for task B is updated to 5 ms and is used as the actual scheduling time for the next task C from container A. However, since the actual scheduling time corresponding to task A is the preset scheduling time and is greater than 0, the task scheduler will send task A to the corresponding processing device (e.g., GPU1) before calculating the actual scheduling time of task B, and GPU1 can acquire the execution instruction from the storage address in task A so as to perform task processing. Since the actual scheduling time for task B is updated to 5 ms, which is also greater than 0, task B may also be scheduled by the task scheduler and processed by the corresponding processing device. If the actual execution time for task B is also 15 ms, which is greater than the preset scheduling time of 10 ms, and the excess time is also 5 ms. Then for a further next task to be executed from container A, for example, task C, the actual scheduling time of task C will be updated from 5 ms to 0 ms, i.e., 5−5=0. At this point, after receiving task C, the task scheduler does not schedule the task C after the arrival of the preset scheduling time of task C, but waiting.

It should be understood that the subsequent task to be executed may refer to a task that follows the current task to be executed or a task that follows the next task to be executed.

It should be noted that the adjustment of the actual scheduling time makes the scheduling time for other virtual devices such as other containers not to be occupied forcibly, thus ensuring the fairness of scheduling while meeting the quality of service (QoS) requirement, and also avoiding malicious occupation of other virtual devices by some programs, for example, time slices (i.e., the preset scheduling time) of other containers are maliciously occupied, thus ensuring the security of the scheduling of the containers.

Based on the excess time, the actual scheduling time is adjusted, and the specific process is as follows.

Specifically, the method 200 further includes: reducing, for the current task to be executed, the excess time to the actual scheduling time corresponding to the current task to be executed so as to update the corresponding actual scheduling time, and using the updated actual scheduling time as the actual scheduling time for the next task to be executed.

Since this has already been described above, it will not be elaborated here.

The waiting process described above may be specifically as follows. The method 200 further includes: when the subsequent updated actual scheduling time is 0, determining, after the arrival of a preset scheduling time corresponding to the subsequent task to be executed, not to schedule the subsequent task to be executed.

For example, as described above, after the task scheduler receives task C, the actual scheduling time for task C is updated to 0. The task scheduler waits for the arrival of the preset scheduling time corresponding to container A to which task C belongs and will not schedule task C anymore, that is, the task scheduler will not send task C through the device driver to the corresponding processing device (e.g., GPU1) for task processing.

However, if the actual scheduling time for task C is not 0 after updated, or if the actual scheduling time for a subsequent task is not 0 after updated, scheduling can be performed.

Specifically, the method 200 further includes: when the actual scheduling time corresponding to the subsequent task to be executed is not 0 after updated, determining, after the arrival of a corresponding preset scheduling time, to schedule the subsequent task to be executed according to the actual execution time.

For example, as described above, after the task scheduler receives task B, as the actual scheduling time is updated to 5 ms, then after receiving task B, the task scheduler sends, after waiting until the preset scheduling time for the container A arrives, task B through the driver device of the cloud server to the corresponding processing device (e.g., GPU1) for task processing. Meanwhile, the actual execution time for GPU1 to process task B is 15 ms as predicted above.

It should be noted that since the actual execution time for task B is 15 ms, the task scheduler may access the processing device before the 15 ms by means of polling to determine whether the processing of task B has been completed, and send the next task when determining that the processing of task B is completed. Under normal circumstances, the processing device can complete the processing of the task at the moment of 15 ms or, alternatively, can complete the processing of the task within an error range of the 15 ms.

After the scheduling of the current task to be executed is completed, whether to schedule the next task to be executed can be determined. After the scheduling is determined to be performed, task scheduling is performed.

Specifically, the method 200 further includes: after determining to schedule the next task to be executed, receiving the next task to be executed, and waiting for the arrival of the corresponding preset scheduling time, and then sending the next task to be executed to a corresponding processing device so as to perform task processing according to the corresponding actual execution time.

Since this has already been described above, it will not be elaborated here. In the case of not scheduling the subsequent task to be executed, preset scheduling time of the subsequent task to be executed may be compensated to tasks from other sources, thus allowing the scheduling time for the tasks to be balanced.

Specifically, the method 200 further includes: receiving the subsequent task to be executed and, after the arrival of the corresponding preset scheduling time, sending a task to be executed from other sources to a corresponding processing device so as to perform task processing according to a corresponding actual execution time.

For example, as described above, the task scheduler does not schedule task C after the arrival of the corresponding preset scheduling time, but may schedule other tasks, such as a task from other containers that follows that task C, for example, task M from container B. This enables scheduling of subsequent schedulable tasks from other containers before the arrival of the next preset scheduling time for container A, thus sharing the current scheduling time for container A with other containers for use.

Since the scheduling of the tasks to be executed from other sources by the task scheduler is the same as the scheduling process described above, it will not be elaborated here. Just for the sake of illustration, the tasks from whichever container can all be scheduled using the scheduling method of the embodiments of the present disclosure. For the tasks from other containers, there are also cases of updating the actual scheduling time and of waiting for tasks to be scheduled, which will not be discussed in detail here.

In addition, since there are multiple containers in the cloud server, the task scheduler may receive multiple tasks to be executed, and these tasks need to be queued for processing. After the arrival of the preset scheduling times for the containers to which the tasks belong, the tasks are processed sequentially in the queued order.

In the case where a task is not scheduled in time by the task scheduler but is determined to wait to be scheduled, after waiting until the task can be scheduled, the specific scheduling process may be as follows. The method 200 further includes: waiting until the arrival of a corresponding next preset scheduling time, and then sending the subsequent task to be executed to a corresponding processing device so as to perform task processing according to a corresponding actual execution time, wherein after the arrival of the corresponding next preset scheduling time, the actual scheduling time corresponding to the subsequent task to be executed is equal to the preset scheduling time.

For example, as described above, the task scheduler does not schedule task C, and determines task C to be in a waiting state, waiting for the arrival of the next preset scheduling time for the container A to which the task C belongs.

It should be noted that in the embodiments of the present disclosure, although a task in a container may occupy the scheduling time for a task from another container, the scheduling time for the another container will be compensated. However, after the scheduling time for the another container is occupied, the task from the another container may not be scheduled to the corresponding processing device exactly on time. That is, the task from the another container cannot be scheduled immediately after the arrival of the preset scheduling time, and there will be some delay. Nevertheless, the task can only be scheduled after the corresponding preset scheduling time has arrived, and the task can be scheduled to the corresponding processing device only after the task scheduler has polled and found that the corresponding processing device has completed the current task.

In addition to the actual execution time being greater than the preset scheduling time, there is also a possibility that the actual execution time is less than the preset scheduling time, in which case the actual scheduling time is adjusted as follows.

Specifically, adjusting an actual scheduling time corresponding to a next task to be executed according to the comparison result includes: determining an idle time when the comparison result is that the actual execution time is less than the preset scheduling time; and adjusting the actual scheduling time corresponding to the next task to be executed from the same source according to the idle time to obtain an updated actual scheduling time, and continuing to use the updated actual scheduling time as an actual scheduling time for a subsequent task to be executed from the same source.

For example, as described above, the task scheduler receives task A (i.e., the current task to be executed) sent from container A and acquires the execution instruction of task A. The corresponding actual execution time of 7 ms is determined, which is compared with a preset scheduling time of 10 ms for container A, and an idle time of 3 ms is determined. Then, the next time the task scheduler receives a task sent by container A, for example, task B, an actual scheduling time for container A is 10+3=13 ms, i.e., changing from the original 10 ms (in this case, the preset scheduling time may be considered as the actual scheduling time in the case where there is no excess time, for example, if task A is the first task from container A, or if none of the previous tasks from container A has excess time or idle time, then the actual scheduling time for task a can be the preset scheduling time and used as the actual scheduling time for task b) to 13 ms. Therefore, the actual scheduling time for task B is updated to 13 ms and is used as the actual scheduling time for the next task C from container A.

It should be noted that in addition to giving an idle time of a task to another task from the same container, it is also possible to idle that idle time directly, thus enabling the corresponding processing device to be idle. In addition, it is also possible to distribute the idled idle time to tasks from other containers to provide compensation or help, and the like.

After determining that there is idle time, the task can be scheduled.

Specifically, the method 200 further includes: determining to schedule the next task to be executed when the comparison result is that the actual execution time is less than or equal to the preset scheduling time.

For example, as described above, if the task scheduler determines that task A has an idle time of 3 ms, the actual scheduling time for task B is updated to 13 ms, which is greater than 0, then the task scheduler can schedule task B after receiving task B.

It should be understood that if the actual execution time for task A is 10 ms, which is equal to the preset scheduling time, then the actual scheduling time for task B will not be updated, and will remain at 10 ms, or some other value greater than 0 (if it is a value equal to 0, then task a is not schedulable, so the premise here is that task A is schedulable and is not in a waiting state), and task B may be scheduled.

The specific process of adjusting the actual scheduling time based on the idle time is as follows.

Specifically, the method 200 further includes: increasing, for the current task to be executed, the idle time to the actual scheduling time corresponding to the current task to be executed so as to update the corresponding actual scheduling time, and using the updated actual scheduling time as the actual scheduling time for the next task to be executed.

Since this has already been described above, it will not be elaborated here.

After the actual scheduling time is updated to 0, since the corresponding task is not schedulable for the time being, the task needs to wait for the arrival of the next preset scheduling time before the task can be scheduled. At that point, the task owes no more scheduling time to tasks from other containers, so the actual scheduling time of the task may also be reset to the preset scheduling time. The specific process is as follows.

Specifically, the method 200 further includes: if the updated actual scheduling time is 0, the actual scheduling time corresponding to the next task to be executed is equal to the preset scheduling time in the case where it is determined that the next task to be executed can be scheduled.

For example, as described above, after the actual scheduling time for task C is updated to 0, the task scheduler waits for the arrival of the next preset scheduling time for container A. After the arrival of the next preset scheduling time for container A, task C can be scheduled. Then the actual scheduling time for container A may also be reset to 10 ms, which is equal to the preset scheduling time, and used as the actual scheduling time for the next task to be executed from container A, for example task D, such that this actual scheduling time of 10 ms will be updated when the task scheduler subsequently receives the task D. For the specific update process, reference may be made to that described above.

It should be noted that the subsequent tasks that appear in the embodiments of the present disclosure, such as tasks B, C, D, etc., are intended only to allow a clear description of the ongoing example but not to indicate that these tasks are identified and that the present solution can only be executed if the identifiers are complied with. These identifiers simply indicate that these tasks are subsequent tasks from the same container.

In addition, since in the process of adjusting the actual scheduling time, the actual scheduling time may not be updated exactly to 0 directly, but may be updated from 5 ms to −1 ms, in which case the adjustment process is as follows.

Specifically, the method 200 further includes: when the actual scheduling time corresponding to a subsequent task to be executed from the same source is directly reduced from a positive number to a negative number, determining a difference value between the negative number and 0; adjusting the actual scheduling time corresponding to the subsequent task to be executed from the same source to 0; receiving the subsequent task to be executed from the same source and, after the arrival of the corresponding preset scheduling time, sending a task to be executed from other sources to a corresponding processing device; and waiting for the arrival of a corresponding next preset scheduling time, and then sending the subsequent task to be executed from the same source to a corresponding processing device so as to perform task processing according to a corresponding actual execution time, wherein after the arrival of the corresponding next preset scheduling time, the actual scheduling time corresponding to the subsequent task to be executed from the same source is equal to the difference between the preset scheduling time and the difference value.

For example, as described above, the task scheduler receives task A (i.e., the current task to be executed) sent from container A and acquires the execution instruction of task A. The corresponding actual execution time of 16 ms is determined, which is compared with the preset scheduling time of 10 ms for container A, and the excess time of 6 ms is determined. Then the next time the task scheduler receives a task sent by container A, for example, task B, of which the actual scheduling time is 10−6=4 ms, i.e., changing from the original 10 ms (in this case, the preset scheduling time may be considered as the actual scheduling time in the case where there is no excess time, for example, if task a is the first task from container A, or if none of the previous tasks from container A has excess time or idle time, then the actual scheduling time for task a can be the preset scheduling time and used as the actual scheduling time for task B) to 4 ms. Therefore, the actual scheduling time for task B is updated to 4 ms and is used as the actual scheduling time for the next task C from container A. After receiving task B, the task scheduler determines that the actual execution time of task B is 16 ms and the excess time of task B is 6 ms, then the actual scheduling time is updated to 4−6=−2 ms. At this point, the task scheduler may then directly update the actual scheduling time to 0 ms and use the updated actual scheduling time as the actual scheduling time for task C, and at the same time determines 2 ms as the difference value. The task scheduler may schedule task A and task B, but may not schedule task C for the time being, and needs to wait. After the arrival of the corresponding preset scheduling time, task C is not scheduled for the time being, and a subsequent task from other containers may be scheduled. After the arrival of the next preset scheduling time, task C may be scheduled. Since at this time, the actual scheduling time for task C is 0, but in the case of rescheduling, the actual scheduling time of task C can be reset to 10 ms, which is equal to the preset scheduling time, the actual scheduling time for the next task D from container A can be updated to 10 ms−2=8 ms.

It should be noted that task scheduling in the embodiments of the present disclosure is independent of whether the device driver is open source or not, and can be easily applied to processing devices with open-source or non-open source device drivers and thus has a wider range of applications.

Figure 4:
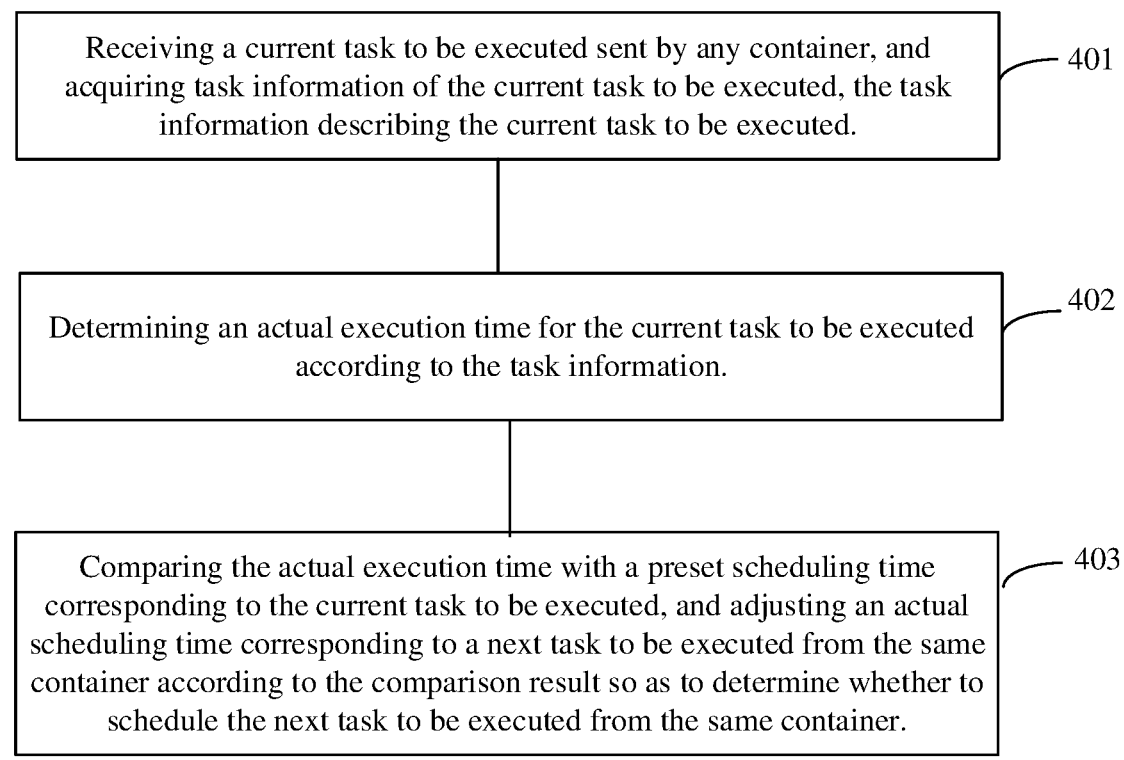
FIG. 4 is a flow chart of an example method for scheduling container tasks, according to some embodiments of the present disclosure.

Based on the same inventive concept described above, FIG. 4 illustrates a flow chart of an example method for scheduling container tasks, according to some embodiments of the present disclosure. The method 400 provided by the embodiments of the present disclosure is executed by the above-mentioned cloud server and, more specifically, a task scheduler provided in the cloud server. As shown in FIG. 4, the method 400 includes the following steps.

At 401, a current task to be executed sent by any container is received, and task information of the current task to be executed is acquired, the task information describing the current task to be executed.

At 402, an actual execution time for the current task to be executed is determined according to the task information.

At 403, the actual execution time is compared with a preset scheduling time corresponding to the current task to be executed, and an actual scheduling time corresponding to a next task to be executed from the same container is adjusted according to the comparison result so as to determine whether to schedule the next task to be executed from the same container.

Since the specific implementation of steps 401 to 403 has been described in detail above, it will not be elaborated here.

Here, receiving a current task to be executed sent by any container includes: receiving the current task to be executed according to a communication interface corresponding to the container. The method 400 further includes: determining a container identifier according to the communication interface so as to determine a task to be executed from the same container according to the container identifier.

Since this has already been described above, it will not be elaborated here.

In addition, for the contents not described in detail in the method 400, reference may be made to the steps in the method 200 described above.

Figure 5:
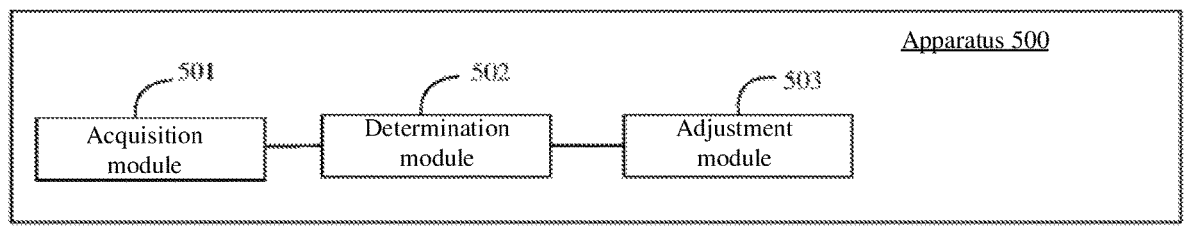
FIG. 5 is a schematic structural diagram of an example apparatus for scheduling tasks, according to some embodiments of the present disclosure.

FIG. 5 is a structural framework schematic diagram of an example apparatus for scheduling tasks, according to some embodiments of the present disclosure. The apparatus 500 may be applied to a cloud server and, more specifically, a task scheduler in the cloud server. The apparatus 500 includes an acquisition module 501, a determination module 502, and an adjustment module 503. A detailed description of the functions of each module will be given below.

Acquisition module 501 is configured to acquire task information of a current task to be executed, the task information describing the current task to be executed.

Determination module 502 is configured to determine an actual execution time for the current task to be executed according to the task information.

Adjustment module 503 is configured to compare the actual execution time with a preset scheduling time corresponding to the current task to be executed, and adjusting an actual scheduling time corresponding to a next task to be executed according to the comparison result so as to determine whether to schedule the next task to be executed.

Specifically, acquisition module 501 is configured to acquire the task information according to a storage address carried by the current task to be executed.

Specifically, determination module 502 is configured to determine an actual execution time for executing the task information as the actual execution time for the current task to be executed.

Specifically, determination module 502 is configured to input the task information into a preset model, and determining an output of the preset model as the actual execution time.

Specifically, determination module 502 is configured to match the task information with multiple pieces of preset task information, and selecting a preset execution time corresponding to matched preset task information according to a matching result as the actual execution time.

Specifically, adjustment module 503 includes: a determination unit configured to determine an excess time when the comparison result is that the actual execution time is greater than the preset scheduling time; and an adjustment unit configured to adjust the actual scheduling time corresponding to the next task to be executed from the same source according to the excess time to obtain an updated actual scheduling time, and continue to use the updated actual scheduling time as an actual scheduling time for a subsequent task to be executed from the same source until a subsequent updated actual scheduling time is reduced to 0, wherein when the current task to be executed is an initial task to be executed from the same source, an actual scheduling time corresponding to the current task to be executed is the same as the actual scheduling time corresponding to the next task to be executed from the same source, and is the preset scheduling time.

In addition, the apparatus 500 further includes: a scheduling module configured to, when the subsequent updated actual scheduling time is 0, determine, after the arrival of a preset scheduling time corresponding to the subsequent task to be executed, not to schedule the subsequent task to be executed.

In addition, the scheduling module is further configured to: when the actual scheduling time corresponding to the subsequent task to be executed is not 0 after updated, determine, after the arrival of a corresponding preset scheduling time, to schedule the subsequent task to be executed according to the actual execution time.

In addition, the apparatus 500 further includes: a sending module configured to: after determining to schedule the next task to be executed, receive the next task to be executed, and wait for the arrival of the corresponding preset scheduling time, and then send the next task to be executed to a corresponding processing device so as to perform task processing according to the corresponding actual execution time.

In addition, the sending module is further configured to: receive the subsequent task to be executed, and after the arrival of the corresponding preset scheduling time, send a task to be executed from other sources to a corresponding processing device so as to perform task processing according to a corresponding actual execution time.

In addition, the sending module is further configured to: wait for the arrival of a corresponding next preset scheduling time, and then send the subsequent task to be executed to a corresponding processing device so as to perform task processing according to a corresponding actual execution time, wherein after the arrival of the corresponding next preset scheduling time, the actual scheduling time corresponding to the subsequent task to be executed is equal to the preset scheduling time.

In addition, the determination unit is further configured to: determine an idle time when the comparison result is that the actual execution time is less than the preset scheduling time. The adjustment unit is further configured to: adjust the actual scheduling time corresponding to the next task to be executed from the same source according to the idle time to obtain an updated actual scheduling time, and continue to use the updated actual scheduling time as an actual scheduling time for a subsequent task to be executed from the same source.

In addition, the determination unit is further configured to: determine to schedule the next task to be executed when the comparison result is that the actual execution time is less than or equal to the preset scheduling time.

In addition, the adjustment unit is further configured to: increase, for the current task to be executed, the idle time to the actual scheduling time corresponding to the current task to be executed so as to update the corresponding actual scheduling time, and use the updated actual scheduling time as the actual scheduling time for the next task to be executed.

In addition, the adjustment unit is further configured to: reduce, for the current task to be executed, the excess time to the actual scheduling time corresponding to the current task to be executed so as to update the corresponding actual scheduling time, and use the updated actual scheduling time as the actual scheduling time for the next task to be executed.

In addition, the adjustment unit is further configured to: if the updated actual scheduling time is 0, set the actual scheduling time corresponding to the next task to be executed equal to the preset scheduling time in the case where it is determined that the next task to be executed can be scheduled.

Here, preset scheduling times corresponding to tasks to be executed from the same source are the same.

In addition, determination module 502 is further configured to: when the actual scheduling time corresponding to a subsequent task to be executed from the same source is directly reduced from a positive number to a negative number, determine a difference value between this negative number and 0. Adjustment module 503 is further configured to: adjust the actual scheduling time corresponding to the subsequent task to be executed from the same source to 0. The sending module is further configured to: receive the subsequent task to be executed from the same source and, after the arrival of the corresponding preset scheduling time, and send a task to be executed from other sources to a corresponding processing device. The sending module is further configured to: wait for the arrival of a corresponding next preset scheduling time, and then send the subsequent task to be executed from the same source to a corresponding processing device so as to perform task processing according to a corresponding actual execution time, wherein after the arrival of the corresponding next preset scheduling time, the actual scheduling time corresponding to the subsequent task to be executed from the same source is equal to the difference between the preset scheduling time and the difference value.

Specifically, acquisition module 501 is configured to receive, via a communication interface, the current task to be executed sent by a virtual device.

Figure 6:
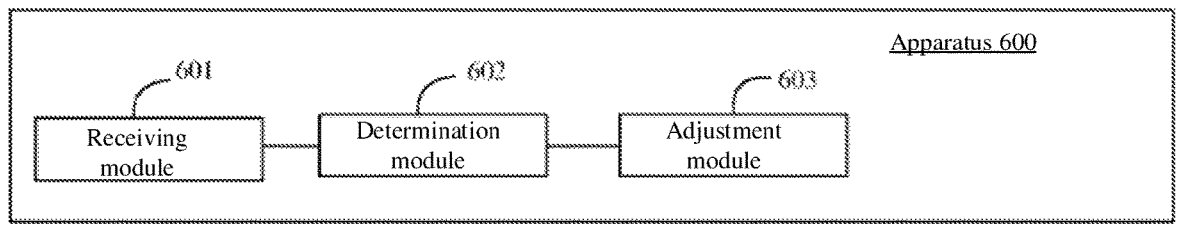
FIG. 6 is a schematic structural diagram of an example apparatus for scheduling container tasks, according to some embodiments of the present disclosure.

FIG. 6 is a structural framework schematic diagram of an example apparatus for scheduling container tasks, according to some embodiments of the present disclosure. The apparatus 600 may be applied to a cloud server and, more specifically, may be a task scheduler provided in the cloud server. The apparatus 600 includes a receiving module 601, a determination module 602, and an adjustment module 603. A detailed description of the functions of each module will be given below.

Receiving module 601 is configured to receive a current task to be executed sent by any container, and acquire task information of the current task to be executed, the task information describing the current task to be executed.

Determination module 602 is configured to determine an actual execution time for the current task to be executed according to the task information.

Adjustment module 603 is configured to compare the actual execution time with a preset scheduling time corresponding to the current task to be executed, and adjust an actual scheduling time corresponding to a next task to be executed from the same container according to the comparison result so as to determine whether to schedule the next task to be executed from the same container.

Specifically, receiving module 601 is specifically configured to: receive the current task to be executed according to a communication interface corresponding to the container. Determination module 602 is configured to: determine a container identifier according to the communication interface so as to determine a task to be executed from the same container according to the container identifier.

It should be noted that for the parts of apparatus 600 that are not mentioned above, reference can be made to the contents of apparatus 500 described above.

Figure 7:
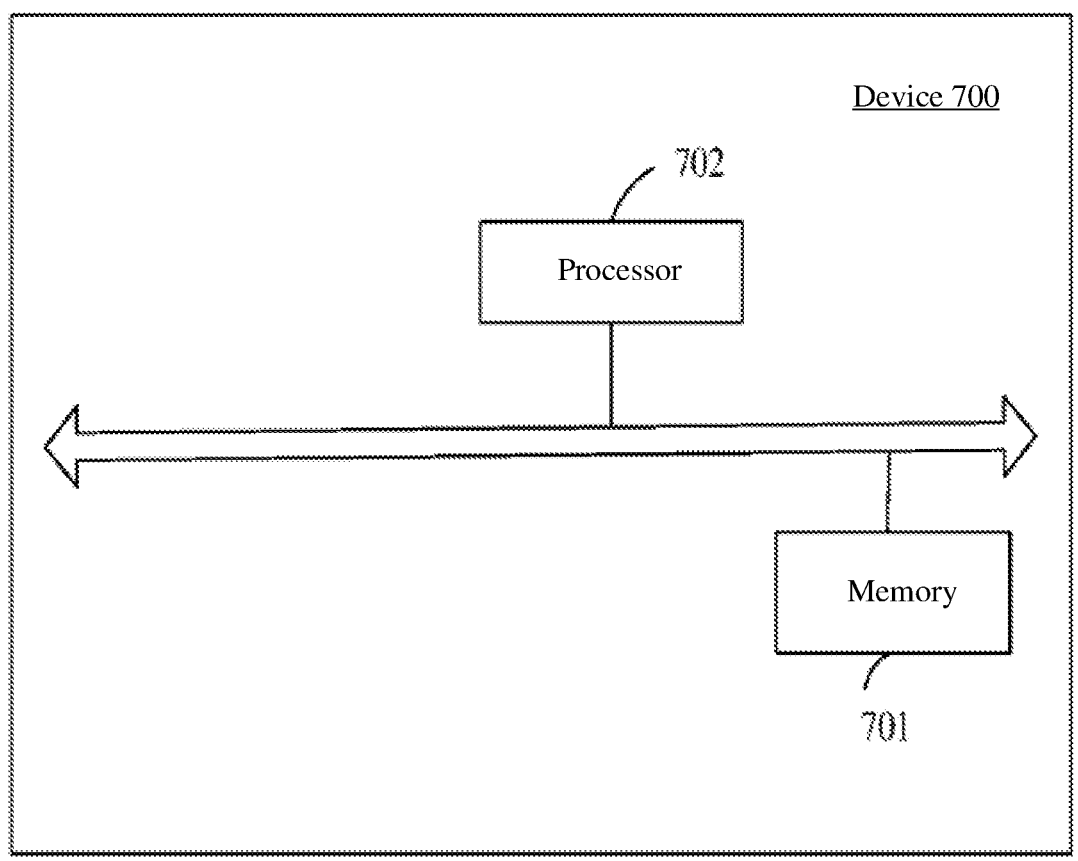
FIG. 7 is a schematic structural diagram of an example computing device, according to some embodiments of the present disclosure.

The internal functions and structure of apparatus 500 shown in FIG. 5 are described above, and in a possible design, the structure of apparatus 500 shown in FIG. 5 may be implemented as a computing device, e.g., a server. As shown in FIG. 7, the device 700 may include a memory 701 and one or more processors 702.

Memory 701 is configured to store instructions.

Processor 702 is configured to execute the instructions to cause the apparatus to perform: acquiring task information of a current task to be executed, the task information describing the current task to be executed; determining an actual execution time for the current task to be executed according to the task information; and comparing the actual execution time with a preset scheduling time corresponding to the current task to be executed, and adjusting an actual scheduling time corresponding to a next task to be executed according to the comparison result so as to determine whether to schedule the next task to be executed.

Specifically, processor 702 is specifically configured to execute the instructions to cause the apparatus to perform: acquiring the task information according to a storage address carried by the current task to be executed.

Specifically, processor 702 is specifically configured to execute the instructions to cause the apparatus to perform: determining an actual execution time for executing the task information as the actual execution time for the current task to be executed.

Specifically, processor 702 is specifically configured to execute the instructions to cause the apparatus to perform: inputting the task information into a preset model, and determining an output of the preset model as the actual execution time.

Specifically, processor 702 is specifically configured to execute the instructions to cause the apparatus to perform: matching the task information with multiple pieces of preset task information, and selecting a preset execution time according to a matching result as the actual execution time.

Specifically, processor 702 is specifically configured to execute the instructions to cause the apparatus to perform: determining an excess time when the comparison result is that the actual execution time is greater than the preset scheduling time; and adjusting the actual scheduling time corresponding to the next task to be executed from the same source according to the excess time to obtain an updated actual scheduling time, and continuing to use it as an actual scheduling time for a subsequent task to be executed from the same source until a subsequent updated actual scheduling time is reduced to 0, wherein when the current task to be executed is an initial task to be executed from the same source, an actual scheduling time corresponding to the current task to be executed is the same as the actual scheduling time corresponding to the next task to be executed from the same source, and is the preset scheduling time.

In addition, processor 702 is further configured to execute the instructions to cause the apparatus to perform: when the subsequent updated actual scheduling time is 0, determining, after the arrival of a preset scheduling time corresponding to the subsequent task to be executed, not to schedule the subsequent task to be executed.

In addition, processor 702 is further configured to execute the instructions to cause the apparatus to perform: when the actual scheduling time corresponding to the subsequent task to be executed is not 0 after updated, determining, after the arrival of a corresponding preset scheduling time, to schedule the subsequent task to be executed according to the actual execution time.

In addition, processor 702 is further configured to execute the instructions to cause the apparatus to perform: after determining to schedule the next task to be executed, receiving the next task to be executed, and waiting for the arrival of the corresponding preset scheduling time, and then sending the next task to be executed to a corresponding processing device so as to perform task processing according to the corresponding actual execution time.

In addition, processor 702 is further configured to execute the instructions to cause the apparatus to perform: receiving the subsequent task to be executed and, after the arrival of the corresponding preset scheduling time, sending a task to be executed from other sources to a corresponding processing device so as to perform task processing according to a corresponding actual execution time.

In addition, processor 702 is further configured to execute the instructions to cause the apparatus to perform: waiting for the arrival of a corresponding next preset scheduling time, and then sending the subsequent task to be executed to a corresponding processing device so as to perform task processing according to a corresponding actual execution time, wherein after the arrival of the corresponding next preset scheduling time, the actual scheduling time corresponding to the subsequent task to be executed is equal to the preset scheduling time.

In addition, processor 702 is further configured to execute the instructions to cause the apparatus to perform: determining an idle time when the comparison result is that the actual execution time is less than the preset scheduling time; and adjusting the actual scheduling time corresponding to the next task to be executed from the same source according to the idle time to obtain an updated actual scheduling time, and continuing to use it as an actual scheduling time for a subsequent task to be executed from the same source.

In addition, processor 702 is further configured to execute the instructions to cause the apparatus to perform: determining to schedule the next task to be executed when the comparison result is that the actual execution time is less than or equal to the preset scheduling time.

In addition, processor 702 is further configured to execute the instructions to cause the apparatus to perform: increasing, for the current task to be executed, the idle time to the actual scheduling time corresponding to the current task to be executed so as to update the corresponding actual scheduling time, and using the updated actual scheduling time as the actual scheduling time for the next task to be executed.

In addition, processor 702 is further configured to execute the instructions to cause the apparatus to perform: reducing, for the current task to be executed, the excess time to the actual scheduling time corresponding to the current task to be executed so as to update the corresponding actual scheduling time, and using the updated actual scheduling time as the actual scheduling time for the next task to be executed.

In addition, processor 702 is further configured to execute the instructions to cause the apparatus to perform: if the updated actual scheduling time is 0, setting the actual scheduling time corresponding to the next task to be executed equal to the preset scheduling time in the case where it is determined that the next task to be executed can be scheduled.

Here, preset scheduling times corresponding to tasks to be executed from the same source are the same.

In addition, processor 702 is further configured to execute the instructions to cause the apparatus to perform: when the actual scheduling time corresponding to a subsequent task to be executed from the same source is directly reduced from a positive number to a negative number, determining a difference value between this negative number and 0; adjusting the actual scheduling time corresponding to the subsequent task to be executed from the same source to 0; receiving the subsequent task to be executed from the same source and, after the arrival of the corresponding preset scheduling time, sending a task to be executed from other sources to a corresponding processing device. The processor 702 is further configured to execute the instructions to cause the apparatus to perform: waiting for the arrival of a corresponding next preset scheduling time, and then sending the subsequent task to be executed from the same source to a corresponding processing device so as to perform task processing according to a corresponding actual execution time, wherein after the arrival of the corresponding next preset scheduling time, the actual scheduling time corresponding to the subsequent task to be executed from the same source is equal to the difference between the preset scheduling time and the difference value.

Specifically, processor 702 is specifically configured to execute the instructions to cause the apparatus to perform: receiving, via a communication interface, the current task to be executed sent by a virtual device.

In addition, the embodiments of the present disclosure provide a non-transitory computer readable medium that stores a set of instructions that is executable by one or more processors of an apparatus to cause the apparatus to initiate a method for scheduling tasks of the method shown in FIG. 2.

Figure 8:
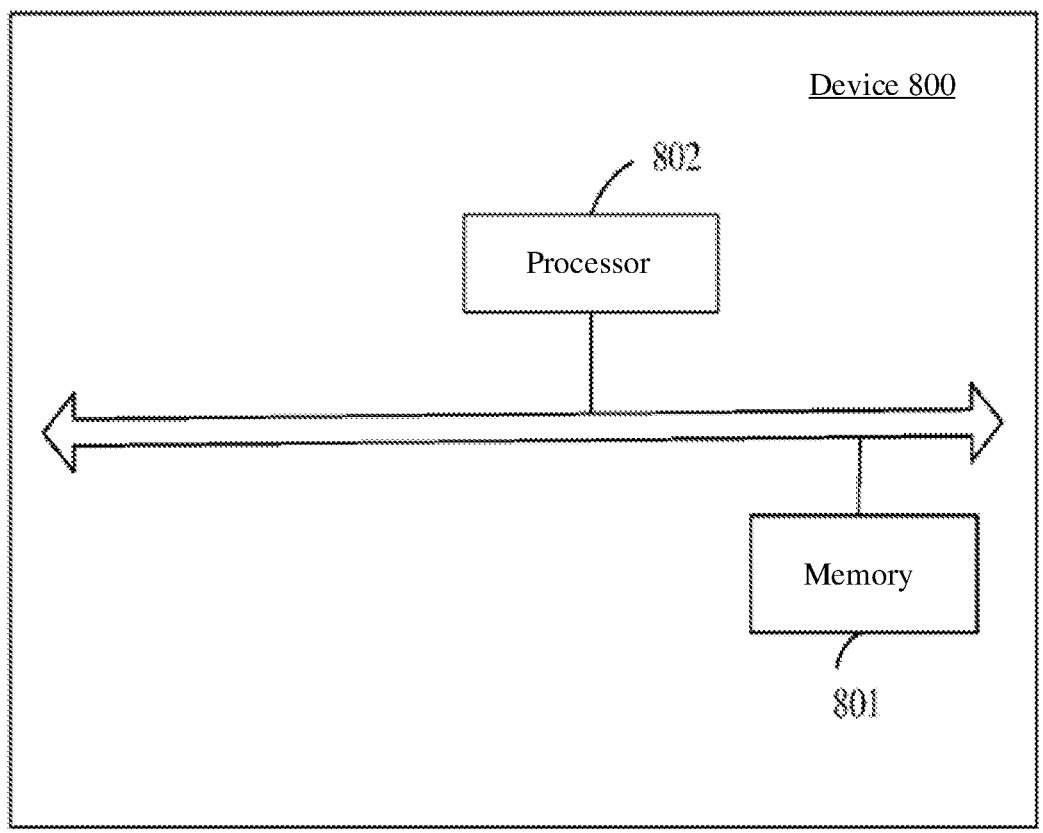
FIG. 8 is a schematic structural diagram of a computing device, according to some embodiments of the present disclosure.

The internal functions and structure of apparatus 600 shown in FIG. 6 are described above, and in a possible design, the structure of apparatus 600 shown in FIG. 6 may be implemented as a computing device, e.g., a server. As shown in FIG. 8, the device 800 may include a memory 801 and one or more processors 802.

Memory 801 is configured to store instructions.

Processor 802 is configured to execute the instructions to perform: receiving a current task to be executed sent by any container, and acquiring task information of the current task to be executed, the task information describing the current task to be executed; determining an actual execution time for the current task to be executed according to the task information; and comparing the actual execution time with a preset scheduling time corresponding to the current task to be executed, and adjusting an actual scheduling time corresponding to a next task to be executed from the same container according to the comparison result so as to determine whether to schedule the next task to be executed from the same container.

Specifically, processor 802 is specifically configured to execute the instructions to perform: receiving the current task to be executed according to a communication interface corresponding to the container. Processor 802 is further configured to execute the instructions to perform: determine a container identifier according to the communication interface so as to determine a task to be executed from the same container according to the container identifier.

It should be noted that for the parts of the device 800 that are not mentioned above, reference can be made to the contents of device 700 described above.

In addition, the embodiments of the present disclosure provide a non-transitory computer readable medium that stores a set of instructions that is executable by one or more processors of an apparatus to cause the apparatus to initiate a method for scheduling container tasks of the method shown in FIG. 4.

Although the present disclosure provides method operation steps described in the embodiments or flowcharts, more or fewer operational steps may be included based on conventional means or non-creative means. The order of the steps listed in the embodiments is merely one of a plurality of step execution orders, and does not indicate the only execution order. When an actual apparatus or client product is executed, sequential execution or parallel execution may be performed according to the method orders shown in the embodiments or the accompanying drawings (for example, in a parallel processor or multi-thread processing environment, and even a distributed data processing environment). The term "include", "comprise" or any other variation thereof is intended to cover a non-exclusive inclusion, which specifies the presence of stated processes, methods, products, or devices, but does not preclude the presence or addition of one or more other processes, methods, products, or devices. Without more limitations, does not exclude other same or equivalent elements existing in the process, the method, the product, or the device that includes the element. The words such as "first" and "second" are only used to denote names, and do not denote any particular order.

A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be deemed as a hardware component and apparatuses included therein for implementing various functions can also be deemed as structures inside the hardware component. Alternatively, apparatuses configured to implement various functions can be considered as both software modules implementing the method and structures inside the hardware component.

The present disclosure can be described in the general context of computer-executable instructions executed by a computer, for example, program modules. Generally, the program module includes a routine, a program, an object, a component, a data structure, a class, and the like for executing a particular task or implementing a particular abstract data type. the present disclosure may be implemented in a distributed computing environment in which tasks are performed by remote processing devices connected by using a communication network. In a distributed computing environment, the program module may be located in both local and remote computer storage media including storage devices.

As can be seen from the foregoing description of the embodiments, a person skilled in the art can clearly learn that the present disclosure may be implemented by using software in combination with a necessary universal hardware platform. Based on such an understanding, the technical solutions of the present disclosure essentially may be implemented in a form of a software product. The computer software product may be stored in a storage medium such as a ROM/RAM, a magnetic disk, or an optical disc and includes several instructions for instructing a computer device (which may be a personal computer, a mobile terminal, a server, a network device, or the like) to perform the methods in the embodiments of the present disclosure or some parts of the embodiments.

The embodiments of the present disclosure are all described in a progressive manner, for same or similar parts in the embodiments, refer to these embodiments, and descriptions of each embodiment focus on a difference from other embodiments. The specification may be applicable to environments or configurations of multiple universal or dedicated computer systems, for example, a personal computer, a server computer, a handheld device or a portable device, a tablet device, a multi-processor system, a microprocessor-based system, a set-top box, a programmable electronic device, a network PC, a minicomputer, a mainframe computer, and a distributed computing environment including any one of the foregoing system or device.

Although the present disclosure is described through embodiments, it is known to a person skilled in the art that many variations may be made to the present disclosure without departing from the spirit of the present disclosure, and it is expected that the appended claims include these variations and changes without departing from the spirit of the present disclosure.

What is claimed is:

1. A method for scheduling tasks, comprising:
   acquiring task information describing a current task to be executed;
   determining an execution time for the current task to be executed according to the task information;
   comparing the execution time with a preset scheduling time corresponding to the current task to be executed; and
   adjusting a scheduling time corresponding to a next task to be executed according to the comparison result so as to determine whether to schedule the next task to be executed;
   wherein adjusting the actual scheduling time corresponding to the next task to be executed according to the comparison result comprises:
   determining an excess time when the comparison result is that the execution time is greater than the preset scheduling time;
   adjusting the actual scheduling time corresponding to the next task to be executed from a same source according to the excess time to obtain an updated actual scheduling time; and
   using the updated actual scheduling time as an actual scheduling time for a subsequent task to be executed from the same source until a subsequent updated actual scheduling time is reduced to 0 or less;
   wherein when the current task to be executed is an initial task to be executed from the same source, an actual scheduling time corresponding to the current task to be executed is the same as the actual scheduling time corresponding to the next task to be executed from the same source, and is the preset scheduling time.

2. The method according to claim 1, wherein acquiring the task information of a current task to be executed comprises:
   acquiring the task information according to a storage address carried by the current task to be executed.

3. The method according to claim 1, wherein determining the execution time for the current task to be executed according to the task information comprises:
   determining an execution time for executing the task information as the execution time for the current task to be executed.

4. The method according to claim 1, wherein determining the execution time for the current task to be executed according to the task information comprises:
   inputting the task information into a preset model; and
   determining an output of the preset model as the execution time.

5. The method according to claim 1, wherein determining the execution time for the current task to be executed according to the task information comprises:
   matching the task information with multiple pieces of preset task information, and selecting a preset execution time corresponding to the matched piece of preset task information according to the matching result as the execution time.

6. The method according to claim 1, further comprising:
   when the subsequent updated actual scheduling time is 0 or less, determining, after an arrival of a preset scheduling time corresponding to the subsequent task to be executed, not to schedule the subsequent task to be executed.

7. The method according to claim 1, further comprising:
   when the actual scheduling time corresponding to the subsequent task to be executed is not 0 or less after being updated, determining, after the arrival of a corresponding preset scheduling time, to schedule the subsequent task to be executed according to the execution time.

8. The method according to claim 1, further comprising:
   after determining to schedule the next task to be executed, receiving the next task to be executed, and waiting for the arrival of a corresponding preset scheduling time, and then sending the next task to be executed to a corresponding processing device so as to perform task processing according to the corresponding execution time.

9. The method according to claim 6, further comprising:
   receiving the subsequent task to be executed and, after the arrival of the corresponding preset scheduling time, sending a task to be executed from other sources to a corresponding processing device so as to perform task processing according to a corresponding execution time.

10. The method according to claim 9, further comprising:
waiting for an arrival of a corresponding next preset scheduling time, and then sending the subsequent task to be executed to a corresponding processing device so as to perform task processing according to a corresponding execution time,
wherein after the arrival of the corresponding next preset scheduling time, the actual scheduling time corresponding to the subsequent task to be executed is equal to the preset scheduling time.

11. The method according to claim 1, wherein adjusting the actual scheduling time corresponding to a next task to be executed according to the comparison result comprises:
determining an idle time when the comparison result is that the execution time is less than the preset scheduling time;
adjusting the actual scheduling time corresponding to the next task to be executed from the same source according to the idle time to obtain an updated actual scheduling time; and
using the updated actual scheduling time as an actual scheduling time for a subsequent task to be executed from the same source.

12. The method according to claim 11, further comprising:
determining to schedule the next task to be executed when the comparison result is that the execution time is less than or equal to the preset scheduling time.

13. The method according to claim 11, further comprising:
adding, for the current task to be executed, the idle time to the actual scheduling time corresponding to the current task to be executed so as to update the corresponding actual scheduling time, and using the updated actual scheduling time as the actual scheduling time for the next task to be executed.

14. The method according to claim 1, wherein preset scheduling times corresponding to tasks to be executed from the same source are the same.

15. The method according to claim 1, wherein acquiring task information of the current task to be executed comprises:
receiving, via a communication interface, the current task to be executed sent by a virtual device.

16. An apparatus for scheduling tasks, the apparatus comprising:
a memory configured to store instructions; and
one or more processors configured to execute the instructions to cause the apparatus to perform:
acquiring task information of a current task to be executed, the task information describing the current task to be executed;
determining an execution time for the current task to be executed according to the task information; and
comparing the execution time with a preset scheduling time corresponding to the current task to be executed, and adjusting an actual scheduling time corresponding to a next task to be executed according to the comparison result so as to determine whether to schedule the next task to be executed;
wherein adjusting the actual scheduling time corresponding to the next task to be executed according to the comparison result comprises:
determining an excess time when the comparison result is that the execution time is greater than the preset scheduling time;
adjusting the actual scheduling time corresponding to the next task to be executed from a same source according to the excess time to obtain an updated actual scheduling time; and
using the updated actual scheduling time as an actual scheduling time for a subsequent task to be executed from the same source until a subsequent updated actual scheduling time is reduced to 0 or less,
wherein when the current task to be executed is an initial task to be executed from the same source, an actual scheduling time corresponding to the current task to be executed is the same as the actual scheduling time corresponding to the next task to be executed from the same source, and is the preset scheduling time.

17. A non-transitory computer readable medium that stores a set of instructions that is executable by one or more processors of an apparatus to cause the apparatus to initiate a method for scheduling tasks, the method comprising:
acquiring task information of a current task to be executed, the task information describing the current task to be executed;
determining an execution time for the current task to be executed according to the task information; and
comparing the execution time with a preset scheduling time corresponding to the current task to be executed, and adjusting an actual scheduling time corresponding to a next task to be executed according to the comparison result so as to determine whether to schedule the next task to be executed;
wherein adjusting the actual scheduling time corresponding to the next task to be executed according to the comparison result comprises:
determining an excess time when the comparison result is that the execution time is greater than the preset scheduling time;
adjusting the actual scheduling time corresponding to the next task to be executed from a same source according to the excess time to obtain an updated actual scheduling time; and
using the updated actual scheduling time as an actual scheduling time for a subsequent task to be executed from the same source until a subsequent updated actual scheduling time is reduced to 0 or less;
wherein when the current task to be executed is an initial task to be executed from the same source, an actual scheduling time corresponding to the current task to be executed is the same as the actual scheduling time corresponding to the next task to be executed from the same source, and is the preset scheduling time.

18. The non-transitory computer readable medium according to claim 17, wherein acquiring the task information of a current task to be executed comprises: acquiring the task information according to a storage address carried by the current task to be executed.

19. The non-transitory computer readable medium according to claim 17, wherein determining the execution time for the current task to be executed according to the task information comprises:
inputting the task information into a preset model; and
determining an output of the preset model as the execution time.

20. The method according to claim 1, wherein the task information comprises an execution instruction for the current task to be executed.

\* \* \* \* \*